(12) United States Patent
Tawada

(10) Patent No.: US 11,238,144 B2
(45) Date of Patent: Feb. 1, 2022

(54) USER SELECTION ASSISTANCE APPARATUS, IMAGE FORMING APPARATUS, USER SELECTION ASSISTANCE METHOD, AND STORAGE MEDIUM STORING USER SELECTION ASSISTANCE PROGRAM

(71) Applicant: SHARP KABUSHIKI KAISHA, Sakai (JP)

(72) Inventor: Masaki Tawada, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 263 days.

(21) Appl. No.: 16/523,661

(22) Filed: Jul. 26, 2019

(65) Prior Publication Data
US 2020/0034523 A1 Jan. 30, 2020

(30) Foreign Application Priority Data
Jul. 27, 2018 (JP) .............................. JP2018-141535

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/35* (2013.01); *G07C 9/37* (2020.01); *H04L 63/0861* (2013.01)

(58) Field of Classification Search
CPC .......... G06F 21/32; G06F 21/35; G07C 9/37; H04L 63/0861; H04L 63/083;
(Continued)

(56) References Cited

U.S. PATENT DOCUMENTS 6,907,134 B1 6/2005 Yamada et al.
9,262,613 B1 * 2/2016 Harding .............. G06F 21/6254
(Continued)

FOREIGN PATENT DOCUMENTS

CN 101295352 A 10/2008
CN 101477621 A 7/2009
(Continued)

*Primary Examiner* — Jeffrey C Pwu
*Assistant Examiner* — William A Corum, Jr.
(74) *Attorney, Agent, or Firm* — ScienBiziP, P.C.

(57) ABSTRACT

A user selection assistance apparatus includes: a registration unit that registers information of a plurality of users, which includes biometric features of the respective users, in advance and creates a list; a biometric detection unit that newly detects a current biometric feature of one user; a determination unit that compares the biometric feature that is detected to the biometric features that are registered, and determines a degree of similarity therebetween; a user choosing unit that chooses, from the list, one or more registered users having a biometric feature the degree of similarity of which satisfies a predetermined reference and creates a chosen user list; a display unit that displays the chosen user list; an input unit that receives selection of a specific registered user from the chosen user list; and an execution processing unit that executes predetermined processing when the input unit receives the selection of the specific registered user.

6 Claims, 11 Drawing Sheets

(51) Int. Cl.
*H04L 29/06* (2006.01)
*G06F 21/35* (2013.01)
*G07C 9/37* (2020.01)

(58) Field of Classification Search
CPC ........... G06K 9/00892; G06K 9/00926; H04N 1/4406; H04N 1/442; H04N 1/00474
See application file for complete search history.

(56) References Cited

U.S. PATENT DOCUMENTS

| | | | | |
|---|---|---|---|---|
| 2004/0133582 | A1* | 7/2004 | Howard | G06K 9/00221 |
| 2008/0279425 | A1 | 11/2008 | Tang | |
| 2011/0191329 | A1* | 8/2011 | Petrov | G06K 9/033 |
| | | | | 707/723 |
| 2012/0314911 | A1* | 12/2012 | Paul | G06K 9/00892 |
| | | | | 382/115 |
| 2013/0144759 | A1* | 6/2013 | Toyomura | G06Q 30/0629 |
| | | | | 705/26.64 |
| 2013/0243328 | A1* | 9/2013 | Irie | G06K 9/00926 |
| | | | | 382/192 |
| 2015/0193758 | A1 | 7/2015 | Nimiya | |
| 2015/0229808 | A1 | 8/2015 | Matsumura | |
| 2019/0075460 | A1* | 3/2019 | Sakamoto | H04L 63/104 |
| 2019/0180128 | A1* | 6/2019 | Han | G06K 9/00926 |
| 2019/0182400 | A1* | 6/2019 | Tanaka | H04N 1/00896 |
| 2019/0354802 | A1* | 11/2019 | Lin | G06K 9/4628 |

FOREIGN PATENT DOCUMENTS

| | | |
|---|---|---|
| CN | 102592071 A | 7/2012 |
| CN | 107221107 A | 9/2017 |
| JP | 2000-268175 A | 9/2000 |
| JP | 2015-147367 A | 8/2015 |

* cited by examiner

USER SELECTION ASSISTANCE APPARATUS, IMAGE FORMING APPARATUS, USER SELECTION ASSISTANCE METHOD, AND STORAGE MEDIUM STORING USER SELECTION ASSISTANCE PROGRAM

BACKGROUND

1. Field

The present disclosure relates to a user selection assistance apparatus, an image forming apparatus, a user selection assistance method, and a storage medium storing a user selection assistance program.

2. Description of the Related Art

In recent years, electronic devices such as a smartphone, a personal computer, and a multifunction peripheral have adopted a personal authentication technique of performing personal authentication by detecting a biometric feature such as a face, an iris, a fingerprint, or a voiceprint of a user, and comparing the biometric feature to data of a biometric feature of the user, which is registered in advance.

As such a personal authentication technique, for example, a technique of an image processing system in which when information of a user who is photographed is compared to feature information of the user, which is registered, job information that specifies a user candidate who may be photographed by a camera is generated from a job received from an information processing apparatus and transmitted to the camera so that a user candidate to be compared is limited to efficiently complete comparison processing and improve comparison accuracy is disclosed (for example, refer to Japanese Unexamined Patent Application Publication No. 2015-147367).

Further, a technique of a personal authentication method in which authentication condition data for specifying at least one biometric feature to perform personal authentication is stored in an IC card carried by a user and a biometric feature corresponding to the authentication condition data read from the IC card is detected from the user so that personal authentication using a plurality of biometric features is able to be performed in accordance with request of the user is disclosed (for example, refer to Japanese Unexamined Patent Application Publication No. 2000-268175).

In such a personal authentication technique of performing personal authentication by detecting a biometric feature, however, in a case where many registered users having a biometric feature which is the same as or similar to that of a user are registered, it may be difficult to specify the user.

Further, in a case of face authentication, accuracy of the authentication is lowered due to an angle, shading, or the like of a face that is photographed, so that it may be difficult to specify the user depending on a situation during photographing.

Therefore, a biometric authentication technique with high accuracy has been conventionally demanded for specifying an individual.

On the other hand, even when the biometric authentication technique does not have high accuracy to such a degree that an individual user is able to be specified, there is also a demand for a new intended use of the biometric authentication technique and an example thereof includes utilization for improvement of convenience of a user.

It is desirable to provide a user selection assistance apparatus that assists selection of a user by using biometric authentication, an image forming apparatus, a user selection assistance method, and a storage medium storing a user selection assistance program.

SUMMARY

According to an aspect of the disclosure, there is provided a user selection assistance apparatus including a registration unit that registers information of a plurality of users, which includes biometric features of the respective users, in advance and creates a list, a biometric detection unit that newly detects a current biometric feature of one user, a determination unit that compares the biometric feature that is detected to the biometric features that are registered, and determines a degree of similarity between the biometric feature that is detected and the biometric features that are registered, a user choosing unit that chooses, from the list, one or more registered users having a biometric feature the degree of similarity of which satisfies a predetermined reference and creates a chosen user list, a display unit that displays the chosen user list, an input unit that receives selection of a specific registered user from the chosen user list, and an execution processing unit that executes predetermined processing when the input unit receives the selection of the specific registered user.

Moreover, the disclosure provides an image forming apparatus including: the user selection assistance apparatus; an image processing apparatus that performs processing of image data; and an image forming unit that forms an image on a basis of the image data processed by the image processing apparatus.

Moreover, the disclosure provides a user selection assistance method including: registering information of a plurality of users, which includes biometric features of the respective users, in advance and creating a list; newly detecting a current biometric feature of one user; comparing the biometric feature that is detected to the biometric features that are registered, and determining a degree of similarity between the biometric feature that is detected and the biometric features that are registered; choosing, from the list, one or more registered users having a biometric feature the degree of similarity of which satisfies a predetermined reference and creating a chosen user list; displaying the chosen user list; receiving selection of a specific registered user from the chosen user list; and executing predetermined processing when the selection of the specific registered user is received at the receiving.

Moreover, the disclosure provides a storage medium storing a user selection assistance program which causes a processor of a user selection assistance apparatus to execute: registering information of a plurality of users, which includes biometric features of the respective users, in advance and creating a list; newly detecting a current biometric feature of one user; comparing the biometric feature that is detected to the biometric features that are registered, and determining a degree of similarity between the biometric feature that is detected and the biometric features that are registered; choosing, from the list, one or more registered users having a biometric feature the degree of similarity of which satisfies a predetermined reference and creating a chosen user list; displaying the chosen user list; receiving selection of a specific registered user from the chosen user list; and executing predetermined processing when the selection of the specific registered user is received at the receiving.

In the disclosure, the "user selection assistance apparatus" is an apparatus that, when a user specifies and selects his or her own registration information from a list of a plurality of registered users registered in advance, detects a biometric feature of the user related to the selection and narrows down the list to one or more registered users having a similar biometric feature to thereby improve convenience of the selection of the user.

The "biometric feature" is a biometric feature to specify a user and an example thereof includes a face, an iris, a fingerprint, or a voiceprint. The biometric feature is not limited to one biometric feature and may be a combination of a plurality of biometric features.

The "predetermined reference" is a reference to narrow down a list to a registered user having a biometric feature whose degree of similarity to the biometric feature of a user related to selection is within a predetermined range.

The "information of a user" is information to specify a user and an example thereof includes a name, a face photograph, an e-mail address, or an ID of the user.

The "predetermined processing" is processing, for example, such as login processing after user authentication, execution processing of a predetermined job such as printing, or display or transmission processing of predetermined data.

The "user selection assistance program" is not limited to a program dedicated to the user selection assistance apparatus and may be one executed, for example, by installing an application, which includes the program, in a CPU of a general image forming apparatus or a computer such as a personal computer. Further, the program may be recorded in a computer readable recording medium.

DESCRIPTION OF THE EMBODIMENTS

The disclosure will be described in more detail below with reference to drawings.

Note that, the following description is to be taken in all respects as exemplary only, and is not to be interpreted as being limiting the disclosure.

Embodiment 1

A digital multifunction peripheral 1 which is an embodiment of an image forming apparatus provided with a user selection assistance apparatus of the disclosure will be described with reference to FIGS. 1 and 2.

Figure 1:
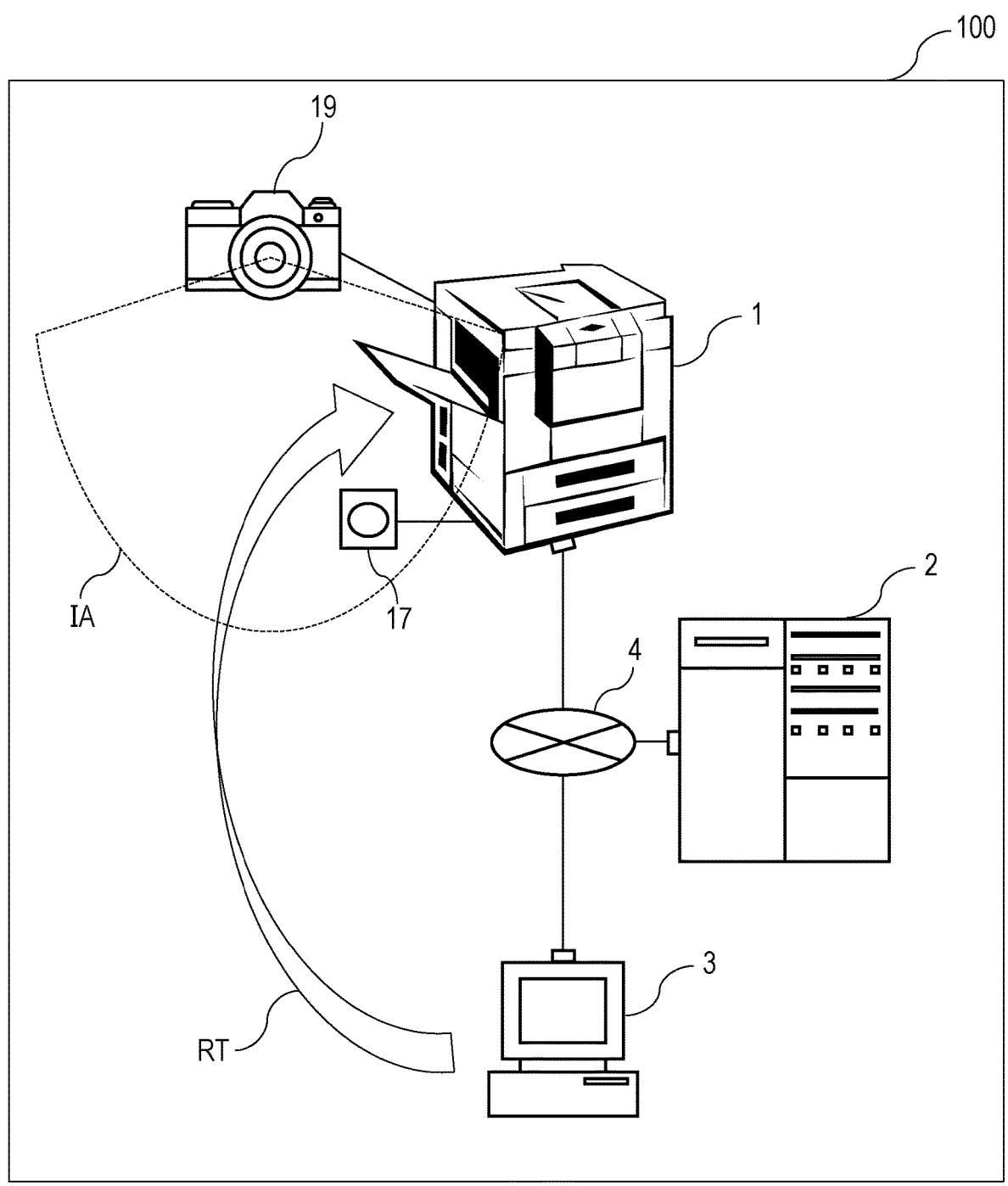
FIG. 1 is an explanatory view illustrating an example of an image forming system according to Embodiment 1 of the disclosure.

FIG. 1 is an explanatory view illustrating an appearance of an example of an image forming system 100 including the digital multifunction peripheral 1 provided with the user selection assistance apparatus according to Embodiment 1 of the disclosure. FIG. 2 is a block diagram illustrating a schematic configuration of the digital multifunction peripheral 1 illustrated in FIG. 1.

Note that, the user selection assistance apparatus of the disclosure is not limited to be applied to the digital multifunction peripheral 1 and is applicable to all devices having a function of selecting a registered user list including registration information of a user related to selection.

As illustrated in FIG. 1, the image forming system 100 of the disclosure is constituted by the digital multifunction peripheral 1, a server 2, an information processing apparatus 3, and a network 4.

The digital multifunction peripheral 1 is an apparatus, such as a multifunction peripheral (MFP), which performs digital processing of image data and has a copy function, a scanner function, and a facsimile function.

The digital multifunction peripheral 1 executes a job such as scanning, printing, copying, or image transmission (Scan to Email, Scan to Ftp) in accordance with an instruction received from a user via an operation unit 182 or a communication unit 15.

The server 2 is an apparatus, such as a host server, which is connected to the digital multifunction peripheral 1 via the network 4.

A list constituted by registered user information including biometric information is stored in the server 2.

Further, the server 2 may be a cloud server configured on a cloud.

Note that, without including the server 2, the image forming system 100 may cause a storage unit 13 of the digital multifunction peripheral 1 to store the list.

The information processing apparatus 3 is an apparatus such as a personal computer (PC). Image data generated by the information processing apparatus 3 is output to the digital multifunction peripheral 1 via the wired or wireless network 4.

Though only one information processing apparatus 3 is illustrated in FIG. 1, a plurality of information processing apparatuses 3 may be included.

The network 4 is a wired or wireless network and an example thereof includes a LAN, a wide area network (WAN) such as the Internet, or a dedicated communication line.

Figure 2:
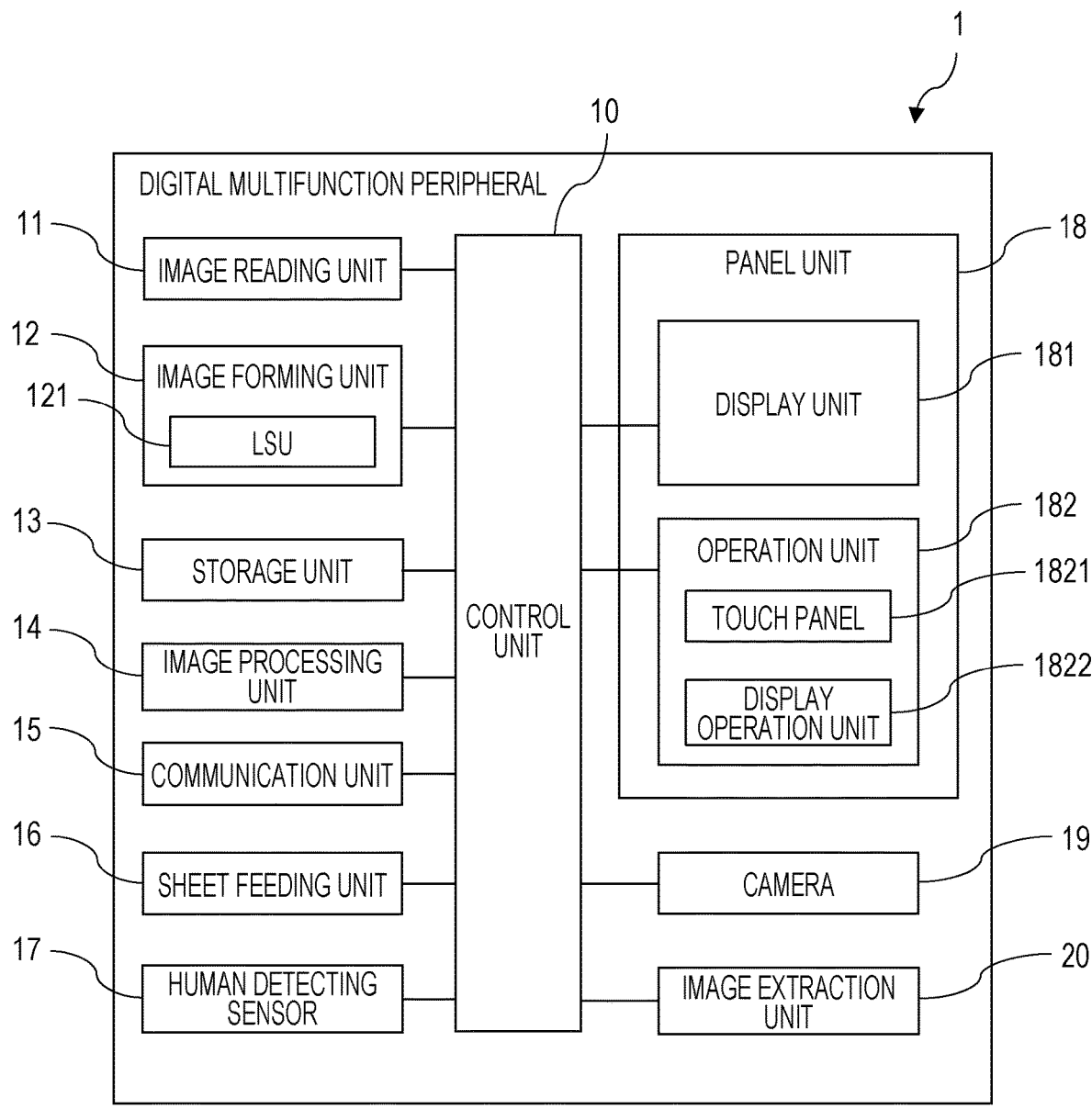
FIG. 2 is a block diagram illustrating a schematic configuration of a digital multifunction peripheral illustrated in FIG. 1.

As illustrated in FIG. 2, the digital multifunction peripheral 1 includes a control unit 10, an image reading unit 11, an image forming unit 12, the storage unit 13, an image processing unit 14, the communication unit 15, a sheet feeding unit 16, a human detecting sensor 17, a panel unit 18, a camera 19, and an image extraction unit 20.

The "user selection assistance apparatus" of the disclosure is achieved by the digital multifunction peripheral 1. A "registration unit" is achieved by cooperation of the storage unit 13 or server 2 and the control unit 10. A "biometric detection unit" of the disclosure is achieved by cooperation of the camera 19, the image extraction unit 20, and the control unit 10. A "determination unit", a "user choosing unit", and an "execution processing unit" of the disclosure are achieved by the control unit 10. An "input unit" of the disclosure is achieved by the operation unit 182.

Components of the digital multifunction peripheral 1 will be described below.

The control unit 10 controls the digital multifunction peripheral 1 in an integrated manner and is constituted by a CPU, a RAM, a ROM, various interface circuits, and the like.

To control an overall operation of the digital multifunction peripheral 1, the control unit 10 performs detection of the respective sensors such as the human detecting sensor 17 and performs monitoring and control of all loads on a motor, a clutch, the panel unit 18, and the like.

The image reading unit 11 is a unit that detects and reads a document placed on a document platen or a document conveyed from a document tray and generates image data, and is also a unit that acquires image data generated by an external apparatus such as the information processing apparatus 3 or a facsimile apparatus (not illustrated), each of which is connected to the network 4.

Note that, when acquiring image data from the information processing apparatus 3 or the like, the image reading unit 11 may acquire the image data via the wired or wireless network 4 or acquire the image data recorded in a USB or the like.

The image forming unit 12 is a unit that prints and outputs image data, which is generated by the image processing unit 14, onto a sheet and includes an LSU 121.

The LSU 121 is a device that irradiates a surface of a photosensitive drum in a charged state with laser light corresponding to image information constituted by a digital signal acquired by the image reading unit 11 and forms an electrostatic latent image.

The storage unit 13 is an element or a storage medium in which information, a control program, and the like that are used to realize various functions of the digital multifunction peripheral 1 are stored. For example, a semiconductor device such as a RAM or a ROM, or a storage medium such as a hard disk, a flash memory unit, or an SSD is used.

Note that, a program and data may be retained in different devices in such a manner that a region in which the data is retained is constituted by a hard disk drive and a region in which the program is retained is constituted by a flash memory unit.

The image processing unit 14 is a unit that converts an image of a document read by the image reading unit 11 into an appropriate electric signal to generate image data, and performs processing of enlargement, reduction, or the like of the image data, which is input from the image reading unit 11, so that an output satisfies an instruction via the operation unit 182.

The communication unit 15 is a unit that communicates with an external device such as the server 2, the information processing apparatus 3, or a facsimile apparatus via the network 4 and transmits or receives various kinds of information, such as an electronic mail and FAX data, to or from such external communication apparatuses.

The sheet feeding unit 16 is a unit that conveys a sheet stored in a sheet feed cassette or a manual feed tray to the image forming unit 12.

The human detecting sensor 17 is a sensor that detects a human body in a predetermined range.

As the human detecting sensor 17, for example, a pyroelectric infrared sensor provided with a pyroelectric element that detects an amount of change in an infrared ray, which is caused by an action of a human body, or the like is used.

Further, the human detecting sensor 17 may be one that detects a human body by analyzing an image acquired by an image capturing device such as the camera 19. In this case, a predetermined range is subjected to image capturing at a predetermined time interval and whether or not there is change between images of a plurality of frames, which are captured, is detected, and when there is change between the images, it is regarded that a human body is found, and detection of the human body is performed.

The human detecting sensor 17 performs an output when a target is in a predetermined range (for example, 0 m to 5 m).

The panel unit 18 is a unit provided with a liquid crystal display and includes a display unit 181 and the operation unit 182.

The display unit 181 is a unit that displays various kinds of information. The display unit 181 is constituted by, for example, a CRT display, a liquid crystal display, an EL display, or the like and is a display device, such as a monitor or a line display, which allows an operating system or application software to display electronic data such as a processing state. The control unit 10 causes the display unit 181 to perform display related to an operation and a state of the digital multifunction peripheral 1.

The operation unit 182 includes a touch panel 1821 and a display operation unit 1822 and is a unit that receives an instruction from the user.

The camera 19 is a unit that acquires an image of an outside of the digital multifunction peripheral 1. The camera 19 photographs a human body coming in a predetermined photographing range IA through a movement path RT or the like as illustrated in FIG. 1.

The image extraction unit 20 is a unit that performs processing of an image acquired by the camera 19 and extracts a biometric feature of a human body in the image.

As the biometric feature that is extracted, there is a feature of a face, an iris, a body structure, or the like.

Note that, though face authentication by the camera 19 and the image extraction unit 20 is taken as an example in Embodiment 1, for example, fingerprint authentication in which a fingerprint is extracted from a finger of the user, which touches the touch panel 1821 of the operation unit 182, and analyzed, voiceprint authentication in which voice of the user, which is acquired via a microphone, is subjected to sound analysis, or the like may be adopted.

<Example of User Selection Assistance Processing by Image Forming System 100>

Next, an example of user selection assistance processing by the image forming system 100 according to Embodiment 1 of the disclosure will be described with reference to FIGS. 3 to 6.

Figure 3:
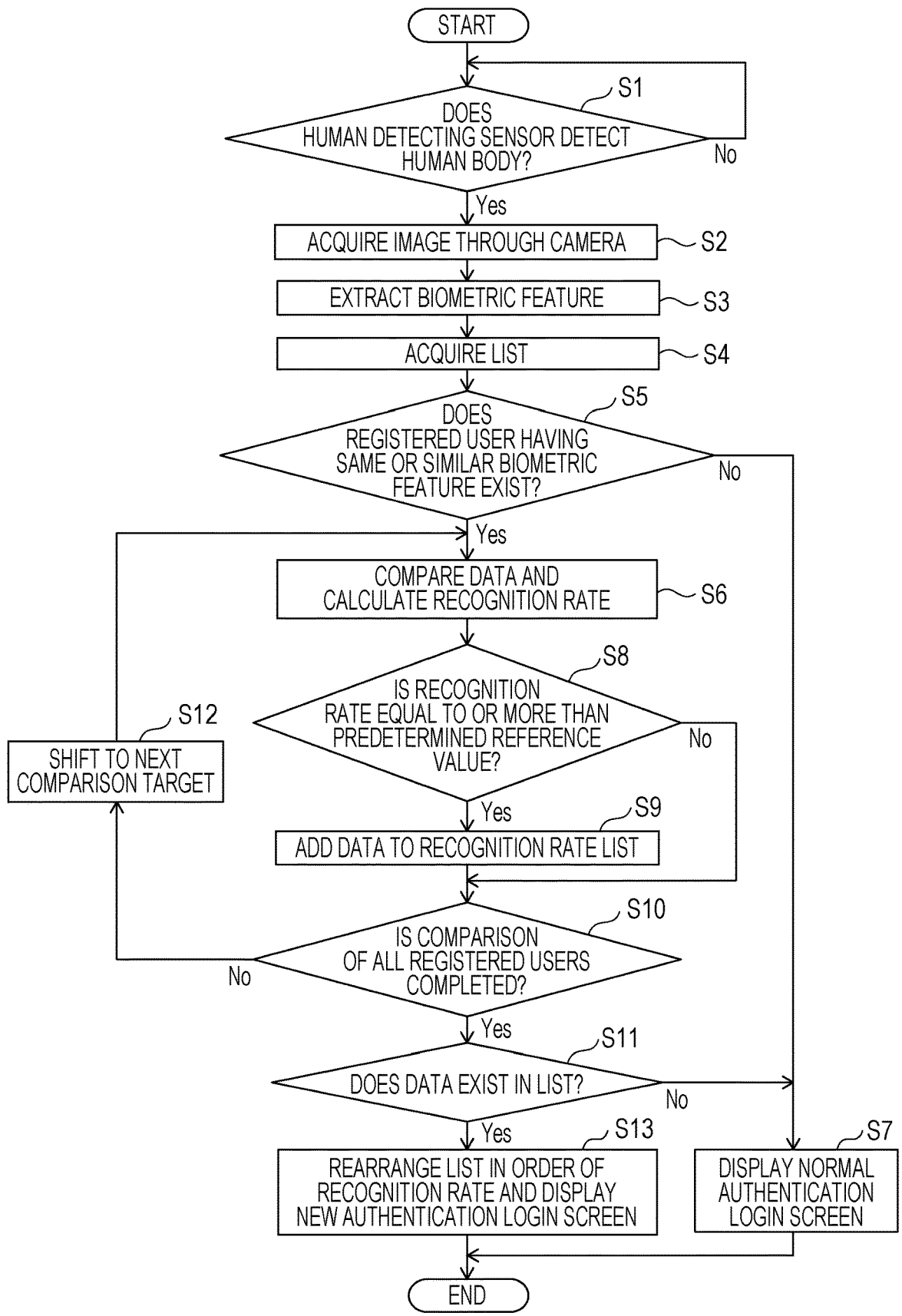
FIG. 3 is a flowchart illustrating an example of a flow of user selection assistance processing by the image forming system illustrated in FIG. 1.
Figure 4:
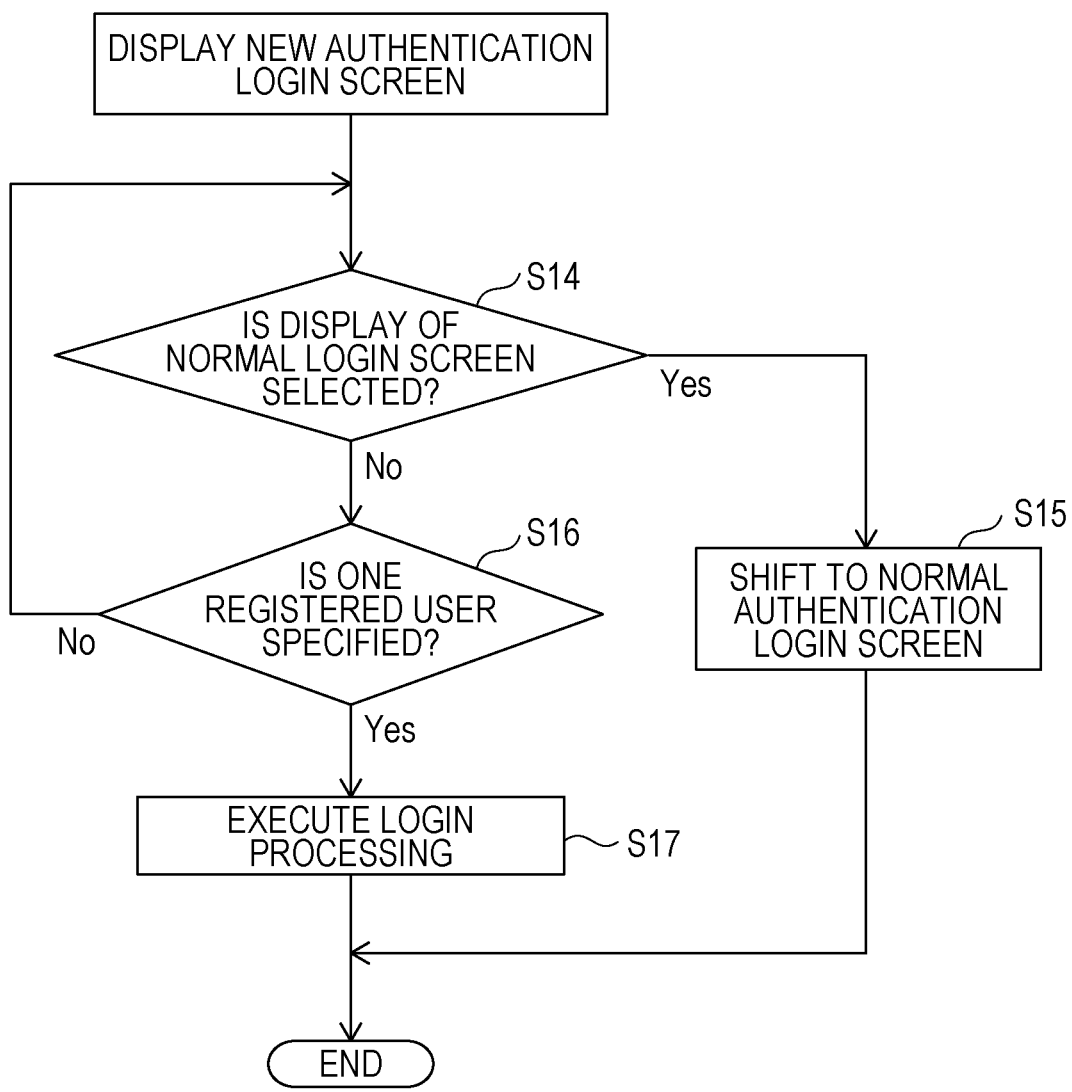
FIG. 4 is a flowchart illustrating an example of a flow of processing after display of a new authentication login screen by the image forming system illustrated in FIG. 1.

FIG. 3 is a flowchart illustrating an example of a flow of the user selection assistance processing by the image forming system 100 illustrated in FIG. 1. FIG. 4 is a flowchart illustrating an example of a flow of processing after display of a new authentication login screen by the image forming system 100 illustrated in FIG. 1.

At step S1 of FIG. 3, the control unit 10 determines whether or not the human detecting sensor 17 detects a human body (step S1).

When the human detecting sensor 17 detects a human body (when Yes is given in the determination of step S1), the control unit 10 causes the camera 19 to acquire an image of the photographing range IA outside the digital multifunction peripheral 1 at step S2 (step S2).

Then, the control unit 10 performs processing of step S3 (step S3).

On the other hand, when the human detecting sensor 17 does not detect a human body (when No is given in the determination of step S1), the control unit 10 shifts the processing back to step S1 (step S1).

Next, at step S3, the control unit 10 causes the image extraction unit 20 to extract a biometric feature (such as a feature of a face) of a user, which appears in the image acquired by the camera 19 (step S3).

Subsequently, at step S4, the control unit 10 acquires a list of registered users, which is stored in the server 2, via the network 4 (step S4).

Next, at step S5, the control unit 10 determines whether or not a registered user having a biometric feature which is the same as or similar to the biometric feature extracted by the image extraction unit 20 exists in the list (step S5).

When a registered user having the same or similar biometric feature exists (when Yes is given in the determination of step S5), the control unit 10 compares data of the biometric feature of the user, which is extracted by the image extraction unit 20, to data of the biometric feature of the registered user and calculates a recognition rate at step S6 (step S6).

Then, the control unit 10 performs determination of step S8 (step S8).

Here, the recognition rate is calculated on the basis of, for example, the number of feature points of a biometric feature that is detected, a criterion for sameness or similarity, data of a past recognition result, or the like.

On the other hand, when a registered user having the same or similar biometric feature does not exist at step S5 (when No is given in the determination of step S5), the control unit 10 causes the display unit 181 to display a normal authentication login screen at step S7 (step S7) and ends the processing.

Next, at step S8, the control unit 10 determines whether or not the recognition rate is equal to or more than a predetermined reference value (step S8).

When the recognition rate is equal to or more than the predetermined reference value (when Yes is given in the determination of step S8), the control unit 10 adds, to a recognition rate list, data of a target of the comparison at step S9 (step S9).

Then, the control unit 10 performs determination of step S10 (step S10).

The following Table 1 indicates an example of the recognition rate list.

TABLE 1

| No. | ID | Name | E-mail address | Recognition rate |
|---|---|---|---|---|
| 1 | 123456 | Ichiro Kouda | kouda@xxxxx.co.jp | 83% |
| 2 | 135791 | Jiro Otsukawa | otsukawa@xxxxx.co.jp | 70% |
| 3 | 246802 | Saburo Heiyama | heiyama@xxxxx.co.jp | 95% |

On the other hand, when the recognition rate is less than the predetermined reference value (when No is given in the determination of step S8), the control unit 10 performs determination of step S10 (step S10).

Next, at step S10, the control unit 10 determines whether or not comparison of all registered users that are targets is completed (step S10).

When the comparison of all the registered users is completed (when Yes is given in the determination of step S10), the control unit 10 determines whether or not data exists in the recognition rate list, at step S11 (step S11).

On the other hand, when the comparison of all the registered users is not completed (when No is given in the determination of step S10), the control unit 10 shifts to comparison of a next registered user at step S12 (step S12) and shifts the processing back to step S6 (step S6).

Next, when data exists in the recognition rate list at step S11 (when Yes is given in the determination of step S11), the control unit 10 rearranges the recognition rate list in order of the recognition rate and causes the display unit 181 to display a new authentication login screen at step S13 (step S13).

On the other hand, when data does not exist in the recognition rate list (when No is given in the determination of step S11), the control unit 10 causes the display unit 181 to display a normal authentication login screen at step S7 (step S7).

Figure 5:
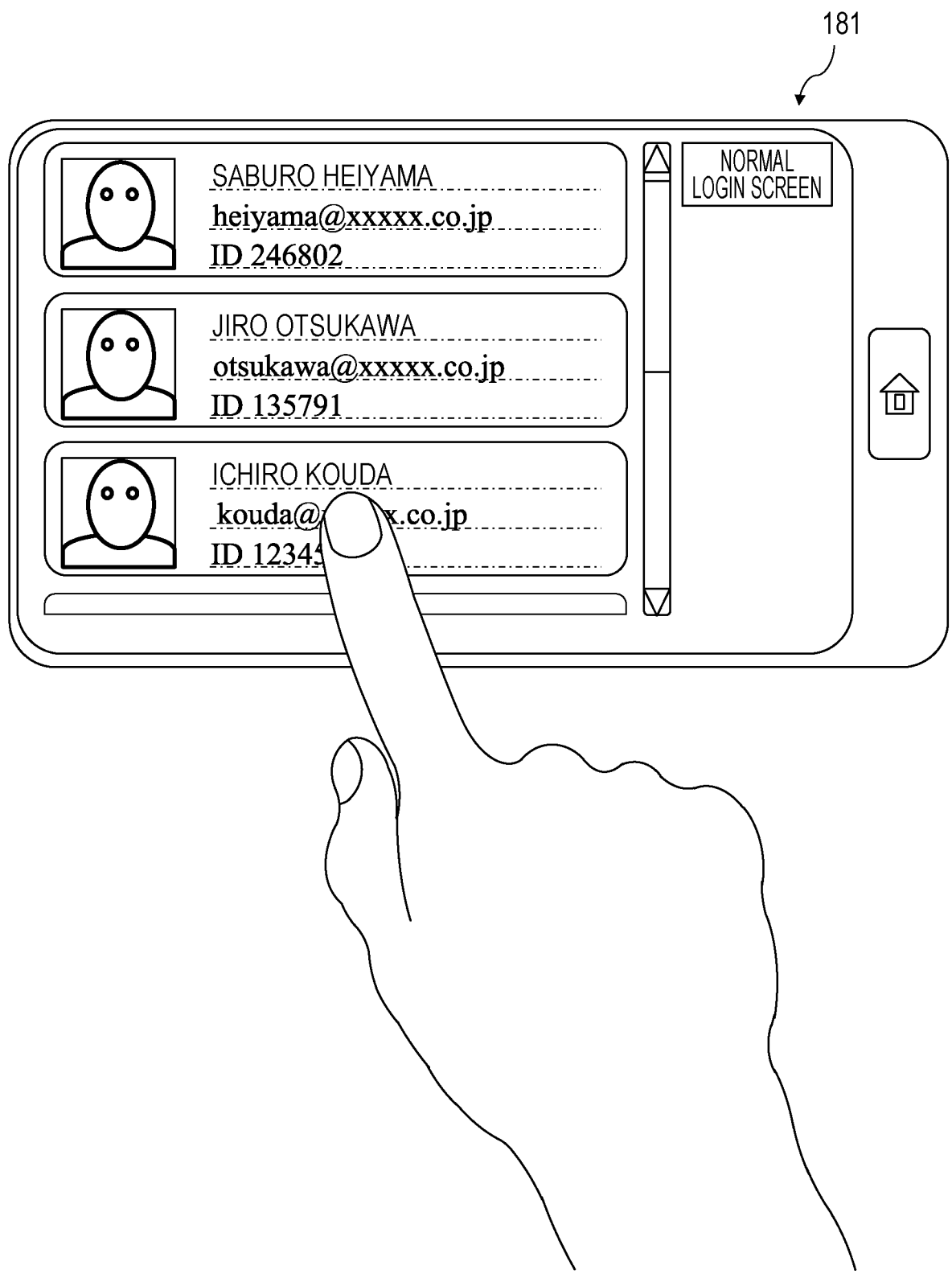
FIG. 5 is an explanatory view illustrating an example of a new authentication login screen of a display unit of the digital multifunction peripheral illustrated in FIG. 1.

FIG. 5 is an explanatory view illustrating an example of a new authentication login screen of the display unit 181 of the digital multifunction peripheral 1 illustrated in FIG. 1.

As illustrated in FIG. 5, a list of registered users is displayed in descending order of the recognition rate in the new authentication login screen.

In the example, a face photograph, a name, an e-mail address, an ID, and the like of a user are displayed.

A user specifies a registered user by touching one of the registered users displayed in the list.

Further, the user is also able to refer to the list of fourth and subsequent registered users by scrolling a scroll bar on a right side of the list.

Here, when the user related to selection is "Ichiro Kouda", the user is able to perform login by touching "Ichiro Kouda" in the list.

Figure 6:
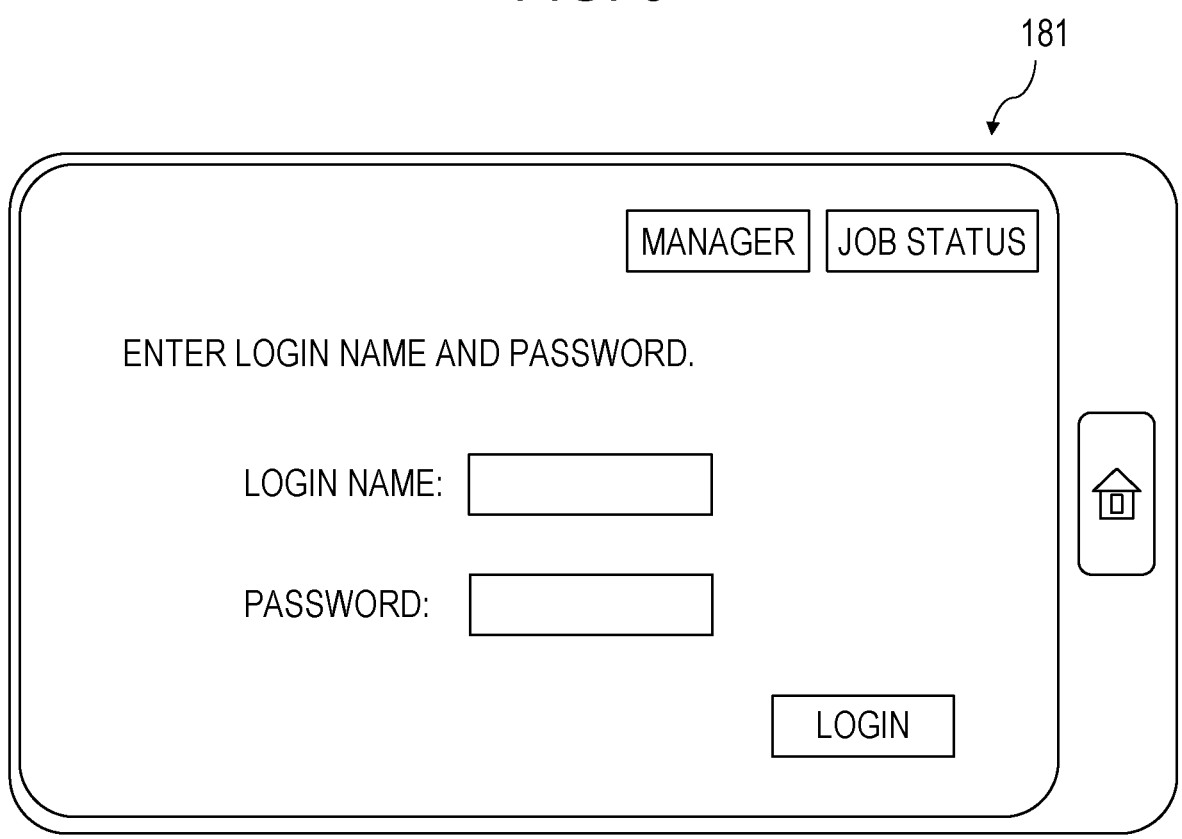
FIG. 6 is an explanatory view illustrating an example of a normal login screen of the display unit of the digital multifunction peripheral illustrated in FIG. 1.

FIG. 6 is an explanatory view illustrating an example of a normal login screen of the display unit 181 of the digital multifunction peripheral 1 illustrated in FIG. 1.

As illustrated in FIG. 6, when the normal login screen is displayed, the user is able to perform login in the same manner as a conventional manner by inputting a "login name" and a "password".

Next, after the new authentication login screen is displayed, the control unit 10 determines at step S14 of FIG. 4 whether or not display of the normal login screen is selected (step S14).

Specifically, as illustrated in FIG. 5, the control unit 10 causes the display unit 181 to display an icon of "normal login screen". The user is allowed to shift to the normal login screen by touching the icon.

In FIG. 4, when display of the normal login screen is selected (when Yes is given in the determination of step S14), the control unit 10 causes the display unit 181 to shift to the normal login screen at step S15 (step S15) and ends the user selection assistance processing.

On the other hand, when display of the normal login screen is not selected (when No is given in the determination of step S14), the control unit 10 determines at step S16 whether or not one registered user is specified among a plurality of registered users displayed in the list on the display unit 181 (step S16).

When one registered user is specified (when Yes is given in the determination of step S16), the control unit 10 executes login processing at step S17 (step S17) and ends the user selection assistance processing.

On the other hand, when one registered user is not specified (when No is given in the determination of step S16), the control unit 10 shifts the processing back to step S14 (step S14).

In this manner, when registered users having a biometric feature which is the same as or similar to that of the user related to selection are displayed in a list in descending order of the recognition rate so as to allow the user to specify one registered user, the digital multifunction peripheral 1 that improves convenience of selection of a user is able to be achieved.

Embodiment 2

Next, user selection assistance processing by the image forming system 100 according to Embodiment 2 of the disclosure will be described with reference to FIGS. 7 and 8.

Figure 7:
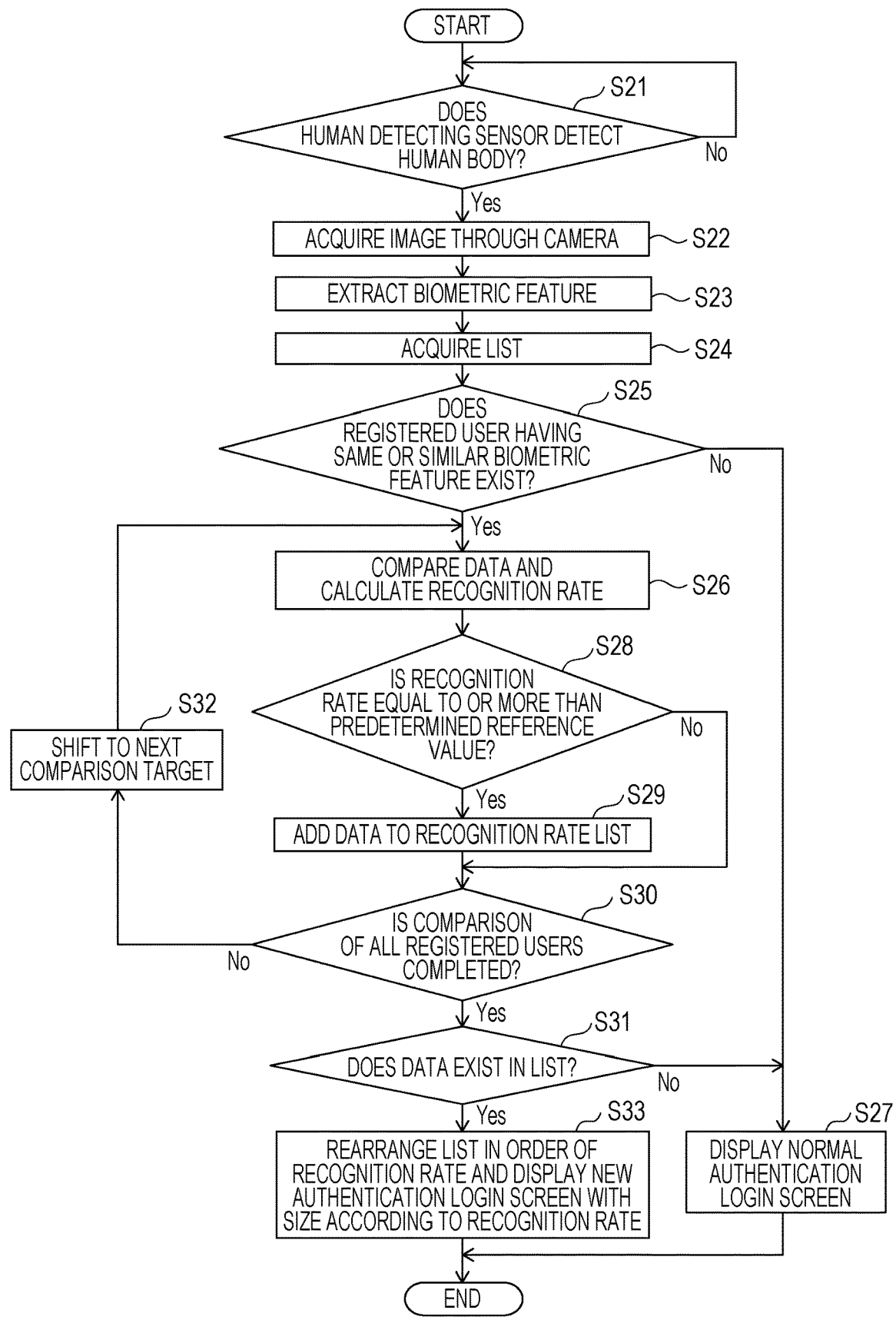
FIG. 7 is a flowchart illustrating an example of a flow of user selection assistance processing by an image forming system according to Embodiment 2.

FIG. 7 is a flowchart illustrating an example of a flow of the user selection assistance processing by the image forming system 100 according to Embodiment 2. FIG. 8 is an explanatory view illustrating an example of a normal login screen of the display unit 181 of the digital multifunction peripheral 1 according to Embodiment 2.

Note that, steps S21 to S32 of FIG. 7 respectively correspond to steps S1 to S12 of FIG. 3, so that description thereof will be omitted.

Here, processing of step S33 different from step S13 in FIG. 3 will be described.

When data added to the list exists at step S31 (when Yes is given in the determination of step S31), the control unit 10 rearranges the recognition rate list in order of the recognition rate and causes the display unit 181 to display a new authentication login screen with a size according to the recognition rate at step S33 (step S33).

Figure 8:
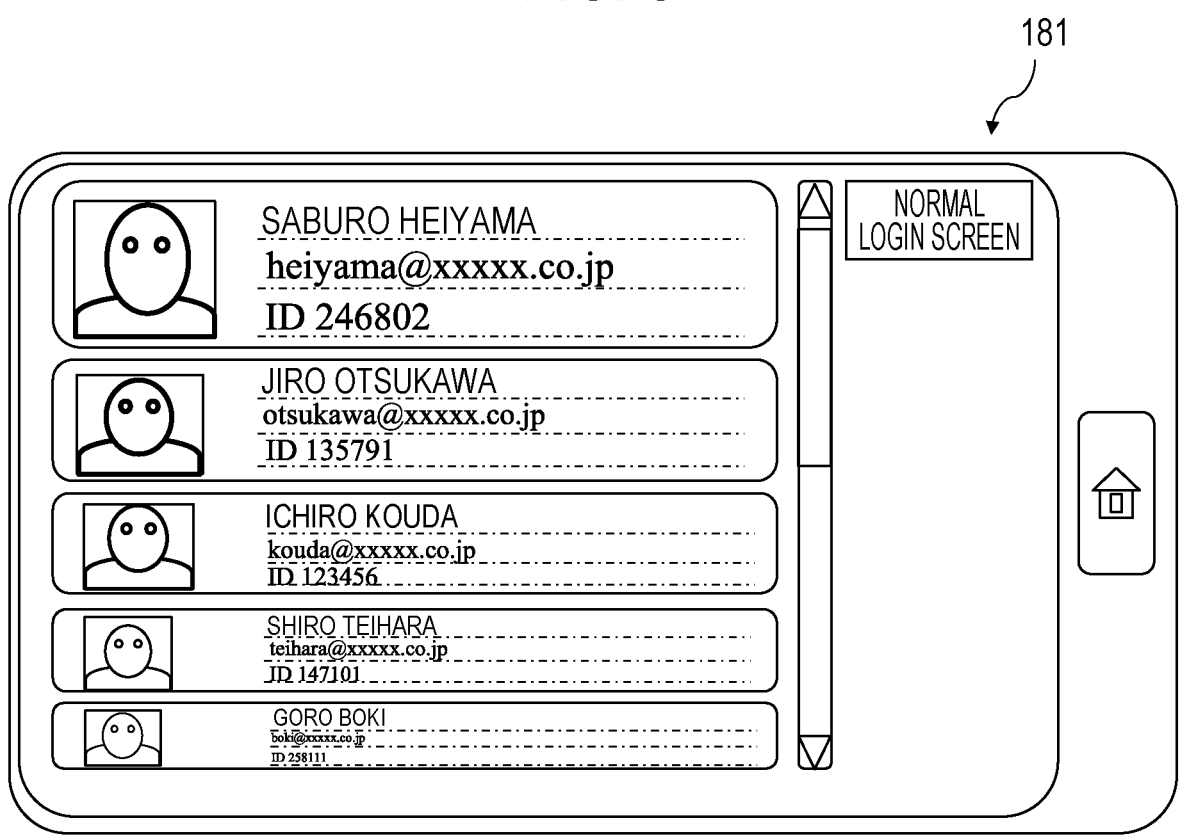
FIG. 8 is an explanatory view illustrating an example of a normal login screen of a display unit of a digital multifunction peripheral according to Embodiment 2.

In the example of FIG. 8, the recognition rate list is displayed with a size according to the recognition rate so that the size increases toward an upper part of the display unit 181 and decreases toward a lower part thereof.

Note that, a ratio of the size of the recognition rate list does not need to be necessarily matched with the recognition rate and may be appropriately changed in accordance with easiness in viewing a screen.

In this case, when the user scrolls the recognition rate list to view a lower side of the recognition rate list, the display unit 181 may be caused to perform display so that the recognition rate list is enlarged as being moved to an upper side and has a largest size at an uppermost end.

In this manner, not only by rearranging the recognition rate list in order of the recognition rate but also by causing the display unit 181 to perform display with a size according to the recognition rate, the user is able to intuitively grasp the recognition rate list, so that the digital multifunction peripheral 1 that improves convenience of selection of a user is able to be achieved.

That is, since a registered user whose recognition rate of biometric authentication is high is displayed in a display form allowing easier recognition than a registered user whose recognition rate is low, the user selection assistance apparatus that improves convenience of selection of a user is able to be achieved.

Note that, the "display form allowing easier recognition" is a display form such as a position, a size, or a color by which registration information of a registered user whose recognition rate is high is easily recognized, for example, by displaying registration information of a registered user with a larger size toward the upper side of the screen, displaying registration information of a registered user whose recognition rate is high with a large size in a center of the screen, displaying registration information of a registered user whose recognition rate is high in a conspicuous color, or the like.

Embodiment 3

Next, user selection assistance processing by the image forming system 100 according to Embodiment 3 of the disclosure will be described with reference to FIG. 9.

Figure 9:
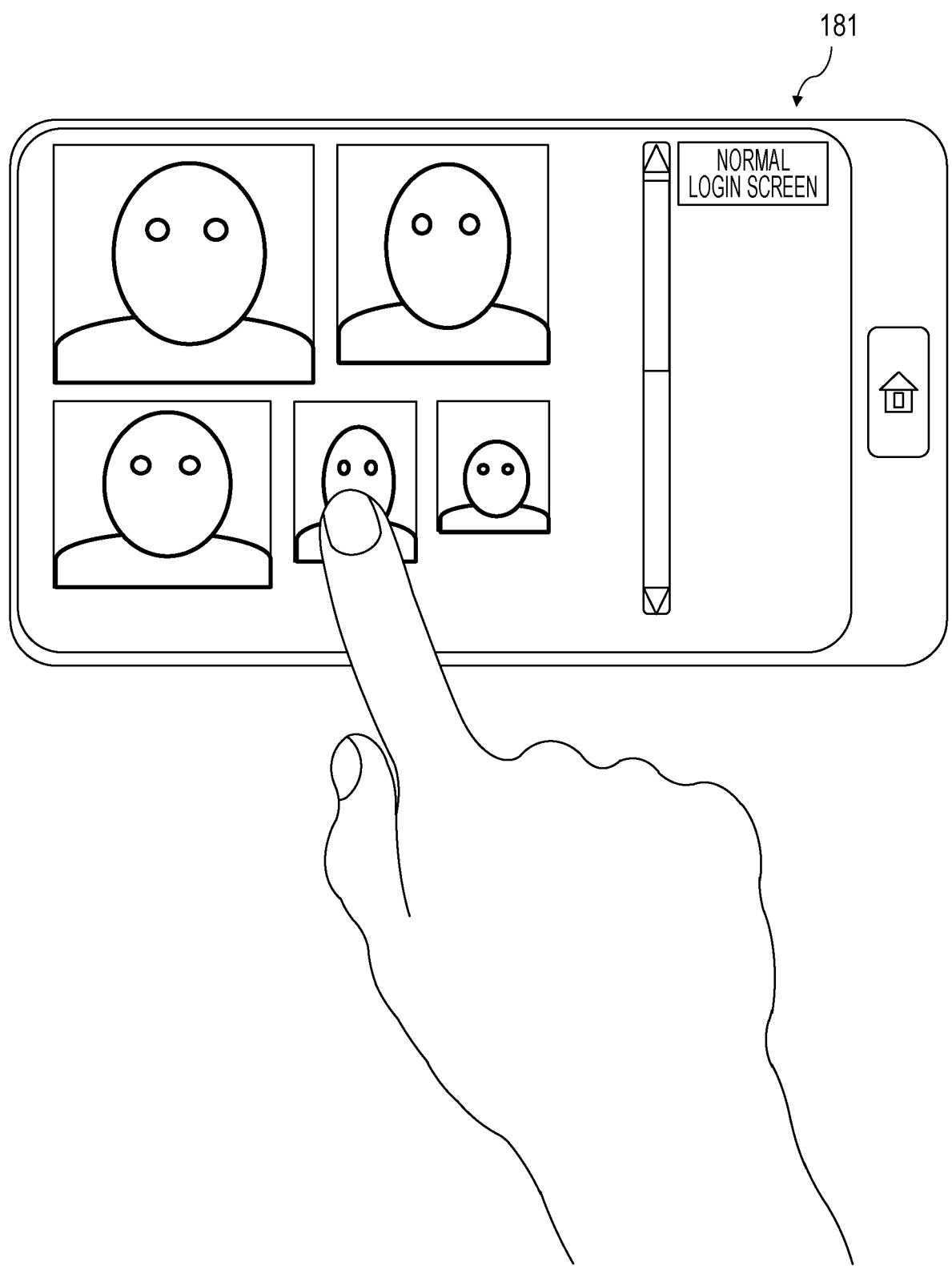
FIG. 9 is an explanatory view illustrating an example of a normal login screen of a display unit of a digital multifunction peripheral according to Embodiment 3.

FIG. 9 is an explanatory view illustrating an example of a normal login screen of the display unit 181 of the digital multifunction peripheral 1 according to Embodiment 3.

In Embodiment 2, as illustrated in FIG. 8, the recognition rate list is rearranged in order of the recognition rate and the display unit 181 is caused to display the recognition rate list in order from the upper part with a size according to the recognition rate.

On the other hand, in Embodiment 3, as illustrated in FIG. 9, the display unit 181 is caused to display face images of registered users so that sizes are reduced from an upper left side to a lower right side in accordance with the recognition rate.

The user specifies a registered user by touching one of the face images displayed in the display unit 181.

In this case, when the user scrolls a recognition rate list to view a lower side of the recognition rate list, the display unit 181 may be caused to perform display so that a face image is enlarged as being moved to an upper side and has a largest size at an uppermost end.

In this manner, not only by rearranging the recognition rate list in order of the recognition rate but also by causing the display unit 181 to display a new authentication login screen in which face photographs of users are displayed with a size according to the recognition rate, the user is able to intuitively grasp the recognition rate list, so that the digital multifunction peripheral 1 that improves convenience of selection of a user is able to be achieved.

That is, since a registered user whose recognition rate of biometric authentication is high is displayed in a display form allowing easier recognition than a registered user whose recognition rate is low, the user selection assistance apparatus that improves convenience of selection of a user is able to be achieved.

Note that, the "display form allowing easier recognition" is a display form such as a position, a size, or a color by which registration information of a registered user whose recognition rate is high is easily recognized, for example, by displaying registration information of a registered user with a larger size toward the upper side of the screen, displaying registration information of a registered user whose recognition rate is high with a large size in a center of the screen, displaying registration information of a registered user whose recognition rate is high in a conspicuous color, or the like.

Embodiment 4

Next, user selection assistance processing by the image forming system 100 according to Embodiment 4 of the disclosure will be described with reference to FIGS. 10 and 11.

Figure 10:
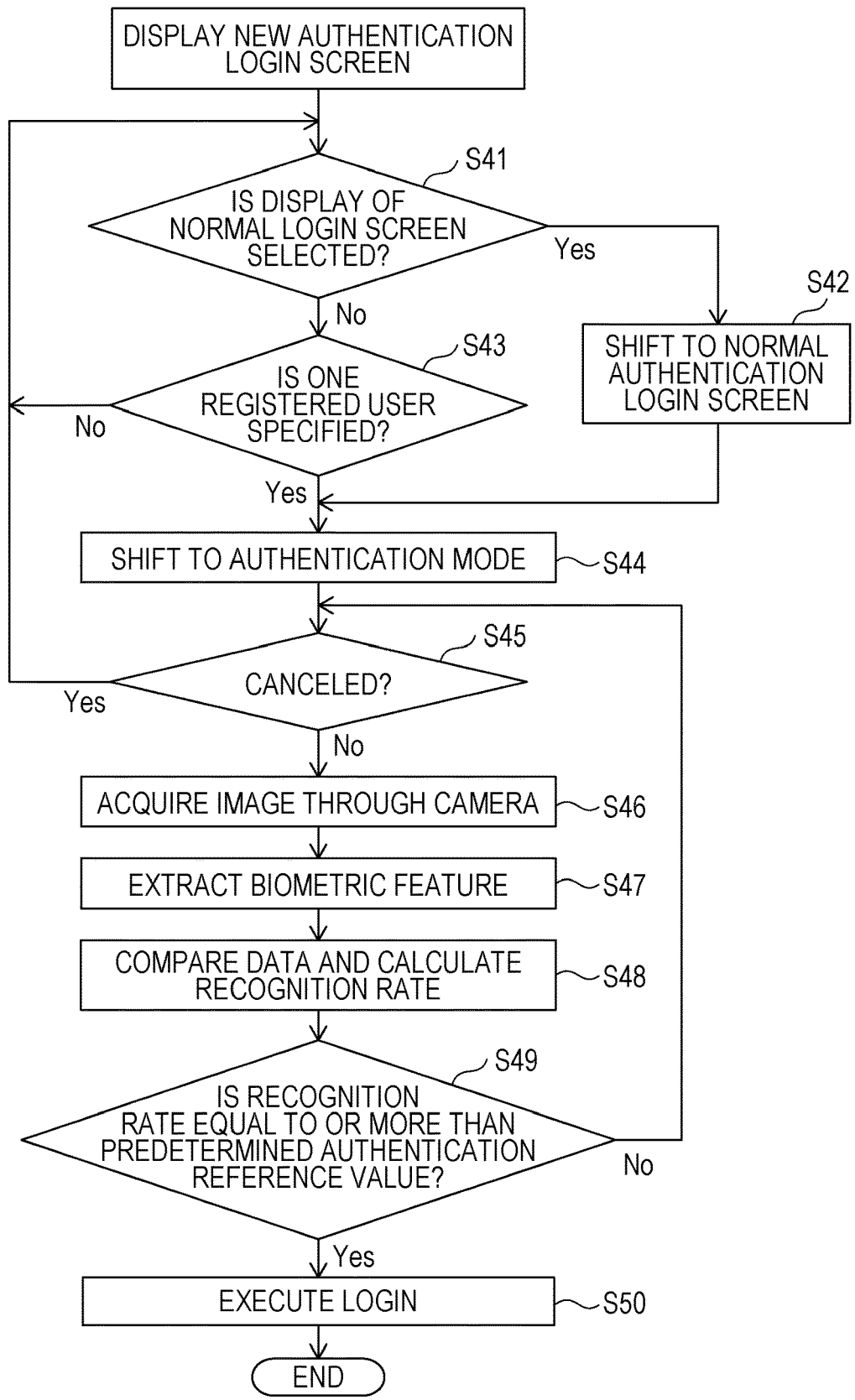
FIG. 10 is a flowchart illustrating an example of a flow of processing after display of a new authentication login screen by an image forming system according to Embodiment 4.

FIG. 10 is a flowchart illustrating an example of a flow of processing after display of a new authentication login screen by the image forming system 100 according to Embodiment 4. FIG. 11 is an explanatory view illustrating an example of an authentication screen of the display unit 181 of the digital multifunction peripheral 1 according to Embodiment 4.

Note that, steps S41 to S43 of FIG. 10 respectively correspond to steps S14 to S16 of FIG. 4, so that description thereof will be omitted.

Here, processing of steps S44 to S50 different from step S17 in FIG. 4 will be described.

In Embodiment 1, when one registered user is specified after the new authentication login screen is displayed, the control unit 10 performs login processing (steps S14 to S17 of FIG. 4).

On the other hand, in Embodiment 4, the login processing is not performed immediately even when one registered user is specified, and a biometric feature of a user related to selection is acquired again and authentication about whether or not the user is definitely the specified registered user is further performed.

Specifically, when one registered user is specified at step S43 of FIG. 10 (when Yes is given in the determination of step S43), the control unit 10 shifts to an authentication mode at step S44 (step S44).

Figure 11:
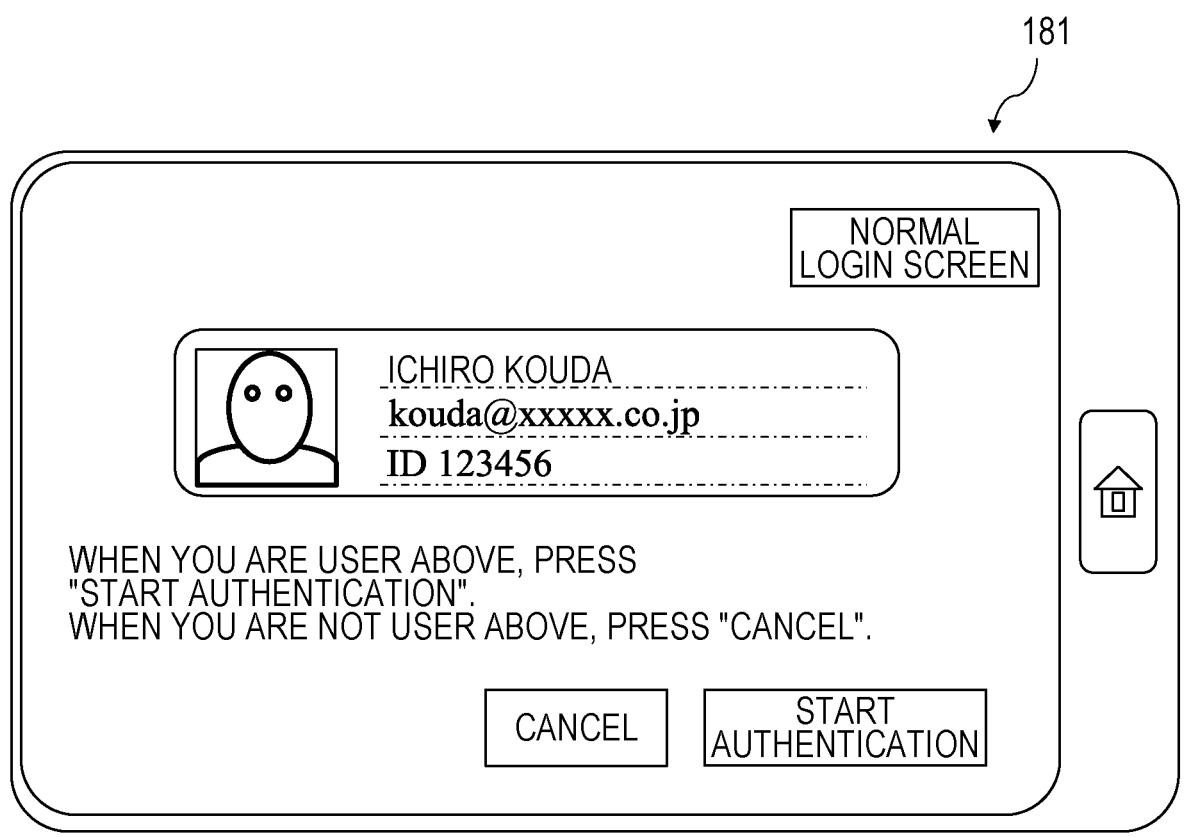
FIG. 11 is an explanatory view illustrating an example of an authentication screen of a display unit of a digital multifunction peripheral according to Embodiment 4.

As illustrated in FIG. 11, in the authentication screen displayed in the display unit 181, with information of the registered user specified by the user, a message of "When you are user above, press "start authentication". When you are not user above, press "cancel"." is displayed.

Further, icons of "start authentication" and "cancel" are also displayed.

Next, at step S45 of FIG. 10, the control unit 10 determines whether or not the icon of "cancel" is selected (step S45).

When the icon of "cancel" is selected (when Yes is given in the determination of step S45), the control unit 10 shifts the processing back to step S41 (step S41).

On the other hand, when the icon of "cancel" is not selected (when No is given in the determination of step S45), the control unit 10 starts the camera 19 to capture an image of the user at step S46 (step S46).

Next, at step S47, the control unit 10 causes the image extraction unit 20 to extract a biometric feature of the user appearing in the image acquired by the camera 19 (step S47).

Here, the biometric feature (second biometric feature) of the user may be the same as or different from the biometric feature acquired in the first authentication.

For example, iris authentication may be performed in the second authentication after face authentication is performed in the first authentication.

At subsequent step S48, the control unit 10 compares the data of the registered user to data of the biometric feature extracted by the image extraction unit 20 and calculates a recognition rate (step S48).

Next, at step S49, the control unit 10 determines whether or not the recognition rate is equal to or more than a predetermined authentication reference value (step S49).

Here, the "authentication reference" is a reference used to determine whether or not the registered user selected by the user related to selection is a user himself or herself.

When the recognition rate is equal to or more than the predetermined authentication reference value (when Yes is given in the determination of step S49), the control unit 10 executes login processing at step S50 (step S50).

On the other hand, when the recognition rate is less than the predetermined authentication reference value (when No is given in the determination of step S49), the control unit 10 shifts the processing back to step S45 (step S45).

In this manner, by further performing user authentication after the user specifies the specific registered user, the digital multifunction peripheral 1 that realizes both improvement of convenience of selection of a user and ensuring of security in user authentication is able to be achieved.

Embodiment 5

In Embodiment 4, biometric authentication based on an image through the same camera is performed before and after display of the new authentication login screen.

On the other hand, in Embodiment 5, without limitation to biometric authentication based on the image through the camera, user authentication is performed by different biometric authentication with use of an iris, a fingerprint, a voiceprint, or the like or by an input of an ID, a password, or the like.

Thereby, the user selection assistance apparatus that improves convenience of selection of a user on the basis of at least one biometric feature of a face, an iris, a fingerprint, and a voiceprint of the user is able to be achieved.

In this manner, by performing different types of authentication in two stages before and after display of the new authentication login screen, the digital multifunction peripheral 1 capable of realizing both improvement of convenience of selection of a user and ensuring of security in user authentication is able to be achieved.

A desirable aspect of the disclosure includes a combination of any of a plurality of aspects described above.

In addition to the embodiments described above, various modifications can be made to the disclosure. Such modifications are to be construed as being within the scope of the disclosure. All modifications that come within the meaning and range of equivalency of the Claims are intended to be included in the disclosure.

The present disclosure contains subject matter related to that disclosed in Japanese Priority Patent Application JP 2018-141535 filed in the Japan Patent Office on Jul. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A user selection assistance apparatus comprising:
a processor,
a memory, and
a display,
wherein the memory stores instructions that cause the processor to:
register information of a plurality of users, which includes biometric features of the respective users, in advance and create a list;
newly detect a current biometric feature of one user;
compare the biometric feature that is detected to the biometric features that are registered, and determine a degree of similarity between the biometric feature that is detected and the biometric features that are registered;
choose, from the list, one or more registered users having a biometric feature the degree of similarity of which satisfies a predetermined reference and create a chosen user list;
control the display to display the chosen user list;
receive an input of selection of a specific registered user from the chosen user list;
execute predetermined processing when the input of the selection of the specific registered user is received;
add second biometric features of the plurality of users to the list;
detect a current second biometric feature of the one user when an input of selection of one registered user from the chosen user list is received;
compare the second biometric feature that is detected to the second biometric features that are registered and determine a degree of similarity between the second biometric feature that is detected and the second biometric features that are registered; and
execute predetermined processing when the degree of similarity satisfies a predetermined authentication reference,
wherein
the memory stores instructions that cause the processor to calculate a recognition rate of each of the registered users; and
control the display to rearrange the chosen user list in descending order of the recognition rate and perform display.

2. The user selection assistance apparatus according to claim 1, wherein
the memory stores instructions that cause the processor to control the display to display the chosen user list in a display form allowing easier recognition of the registered user the higher the recognition rate.

3. The user selection assistance apparatus according to claim 1, wherein
the biometric feature is at least one of a face, an iris, a fingerprint, and a voiceprint of a user.

4. An image forming apparatus comprising:
the user selection assistance apparatus according to claim 1;
an image processing apparatus that performs processing of image data to form an image on a basis of the image data.

5. A user selection assistance method comprising:
registering information of a plurality of users, which includes biometric features of the respective users, in advance and creating a list;
newly detecting a current biometric feature of one user;
comparing the biometric feature that is detected to the biometric features that are registered, and determining a degree of similarity between the biometric feature that is detected and the biometric features that are registered;
choosing, from the list, one or more registered users having a biometric feature the degree of similarity of which satisfies a predetermined reference and creating a chosen user list;
displaying the chosen user list;
receiving selection of a specific registered user from the chosen user list;
executing predetermined processing when the selection of the specific registered user is received at the receiving;
adding second biometric features of the plurality of users to the list;
detecting a current second biometric feature of the one user when an input of selection of one registered user from the chosen user list is received;
comparing the second biometric feature that is detected to the second biometric features that are registered and determining a degree of similarity between the second biometric feature that is detected and the second biometric features that are registered; and
executing predetermined processing when the degree of similarity satisfies a predetermined authentication reference,
wherein
calculating a recognition rate of each of the registered users; and
rearranging the chosen user list in descending order of the recognition rate and perform display.

6. A non-transitory storage medium storing a user selection assistance program which causes a processor of a user selection assistance apparatus to execute:
registering information of a plurality of users, which includes biometric features of the respective users, in advance and creating a list;
newly detecting a current biometric feature of one user;
comparing the biometric feature that is detected to the biometric features that are registered, and determining a degree of similarity between the biometric feature that is detected and the biometric features that are registered;
choosing, from the list, one or more registered users having a biometric feature the degree of similarity of which satisfies a predetermined reference and creating a chosen user list;
displaying the chosen user list;
receiving selection of a specific registered user from the chosen user list;
executing predetermined processing when the selection of the specific registered user is received at the receiving;
adding second biometric features of the plurality of users to the list;
detecting a current second biometric feature of the one user when an input of selection of one registered user from the chosen user list is received;
comparing the second biometric feature that is detected to the second biometric features that are registered and determining a degree of similarity between the second biometric feature that is detected and the second biometric features that are registered; and
executing predetermined processing when the degree of similarity satisfies a predetermined authentication reference, wherein calculating a recognition rate of each of the registered users; and rearranging the chosen user list in descending order of the recognition rate and perform display.

\* \* \* \* \*